United States Patent [19]

Goebel et al.

[11] 4,283,469

[45] Aug. 11, 1981

[54] INTEGRATED ELECTRODE/SEPARATOR STRUCTURES

[75] Inventors: Franz Goebel, Sudbury; Carl R. Schlaikjer, Winchester, both of Mass.

[73] Assignees: GTE Products Corp., Stamford, Conn.; GTE Laboratories Inc., Waltham, Mass.

[21] Appl. No.: 135,417

[22] Filed: Mar. 31, 1980

[51] Int. Cl.³ .............................................. H01M 6/14
[52] U.S. Cl. .................................... 429/196; 429/246; 429/247
[58] Field of Search ............... 429/194, 101, 246, 247, 429/251, 196

[56] References Cited

U.S. PATENT DOCUMENTS

| 3,625,771 | 12/1971 | Arrance | 429/246 X |
| 3,861,963 | 1/1975 | Afrance et al. | 429/246 X |
| 3,929,504 | 12/1975 | Gore et al. | 429/194 |
| 3,993,501 | 11/1976 | Kalnoki-Kis | 429/101 X |
| 4,020,248 | 4/1977 | Goebel | 429/194 X |
| 4,042,756 | 8/1977 | Goebel | 429/194 X |
| 4,154,905 | 5/1979 | Urry | 429/101 X |
| 4,154,906 | 5/1979 | Bubnick | 429/101 X |
| 4,170,693 | 10/1979 | Catanzarite | 429/101 X |
| 4,194,060 | 3/1980 | Schöll | 429/246 X |

Primary Examiner—Charles F. LeFevour
Attorney, Agent, or Firm—Peter Xiarhos

[57] ABSTRACT

An integrated electrode/insulator structure for use as part of an electrochemical system of an electrochemical cell. The electrode/insulator structure includes an electrode and an adherent porous layer of an electrically-nonconductive material deposited on the electrode and physically integrated with the electrode. The material of the adherent porous layer is selected so as to be chemically stable with the electrode and with any other components of the electrochemical system of the electrochemical cell in which the integrated electrode/insulator structure is to be used.

5 Claims, 3 Drawing Figures

INTEGRATED ELECTRODE/SEPARATOR STRUCTURES

The present invention relates to an electrode/insulator structure and, more particularly, to an integrated cathode current collector electrode/separator structure for use in electrochemical cells.

Electrochemical cells of various types are well known to those skilled in the art. By way of example, in U.S. Pat. No. 4,161,063, in the names of Franz Goebel and Nikola Marincic, and assigned to GTE Laboratories Incorporated, there is disclosed an electrochemical cell of a type having an oxidizable active anode, a cathode current collector electrode structure, and a cathodelectrolyte solution comprising a reducible soluble cathode and an electrolyte solute dissolved therein. Although the above components of the electrochemical cell may take a large variety of forms, in a preferred construction of the cell the oxidizable active anode comprises lithium metal, the cathode current collector electrode structure includes carbon black material, the reducible soluble cathode is thionyl chloride and the electrolyte solute is lithium tetrachloroaluminate. In order to achieve a cell of high rate capability and high discharge capacity, the cell normally includes a large number of anodes and cathode current collector electrode structures. The anodes and cathode current collector electrode structures are arranged in alternation and insulated electrically from each other by thin, porous insulators or separators of an electrically non-conductive material. By way of a specific example, each separator may comprise a porous fiberglass sheet of about 0.005 inch thickness and including glass particles or fibers bound together by a binder such as polyvinyl alcohol.

While the above specific arrangement of components and materials result in a cell having desirable structural, electrical and operating characteristics, the polyvinyl alcohol binder employed by the separators is susceptible to chemical reaction with the cathode-electrolyte solution, especially a thionyl chloride liquid cathode. As a result, gaseous products are able to form which build up pressure during the life span of the cell. This buildup of pressure is undesirable because it can cause physical deformation of the cell and, in extreme cases, result in bursting or rupturing of the cell. In addition, external or internal short circuit conditions can develop, causing overheating or thermal runaway of the cell and consequential extreme physical damage to the cell. Further disadvantages of separators as discussed hereinabove are that the separators add to the impurities in the cell (such as water), and the polyvinyl alcohol binder has a degrading effect on lithium anodes which results in a loss of electrical discharge capacity (ampere-hours) of the cell. Further, the use of separators as discussed hereinabove results in a high value of ohmic resistivity between the anodes and cathode current collector electrodes of the cell and, consequently, a reduced cell operating voltage.

BRIEF SUMMARY OF THE INVENTION

In accordance with the present invention, an integrated electrode/insulator structure is provided for use as part of an electrochemical system of an electrochemical cell as described hereinabove.

The integrated electrode/insulator structure in accordance with the invention includes an electrode and an adherent porous layer of an electrically-nonconductive material deposited on the electrode and physically integrated with the electrode. The material of the adherent porous layer is selected so as to be chemically stable with the electrode in contact therewith and with any other components of the electrochemical system of the electrochemical cell in which the integrated electrode/insulator structure is to be used. In a particular embodiment of an electrochemical cell, the electrochemical system includes an anode electrode and an electrolyte solution in contact with the anode electrode and the electrode/insulator structure.

BRIEF DESCRIPTION OF THE INVENTION

Various objects, features and advantages of electrode/separator structures and electrochemical cells employing such electrode/separator structures will be had from a detailed discussion taken in conjunction with the accompanying drawing in which.

DETAILED DESCRIPTION OF THE INVENTION

Figure 1:
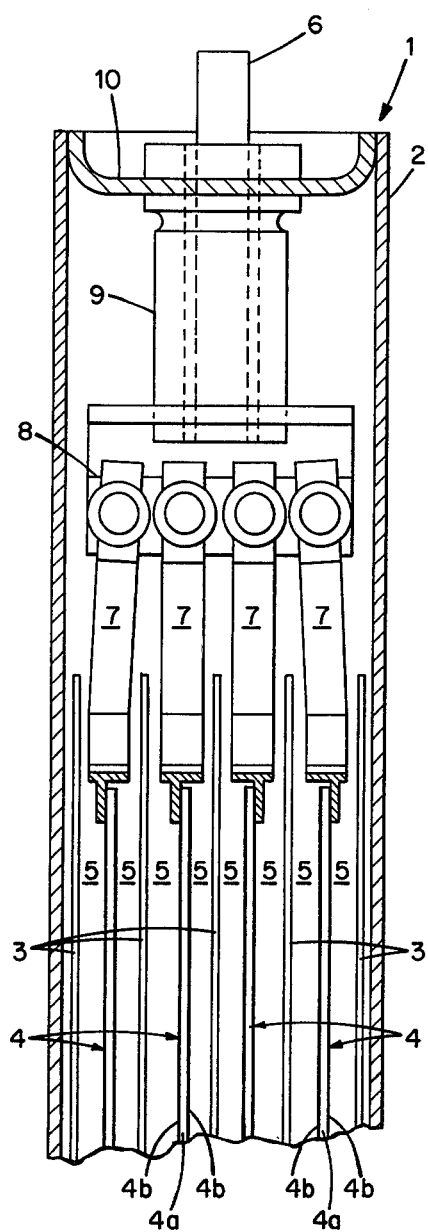
FIG. 1 is a cross-sectional view of an electrochemical cell employing electrode/separator structures in accordance with the present invention.
Figure 2:
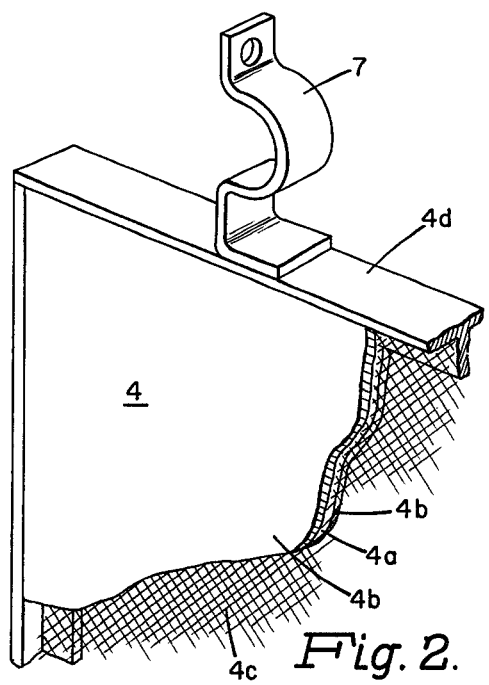
FIG. 2 is an isometric view, partly in cross section, of the electrode/separator structure in accordance with the invention.
Figure 3:
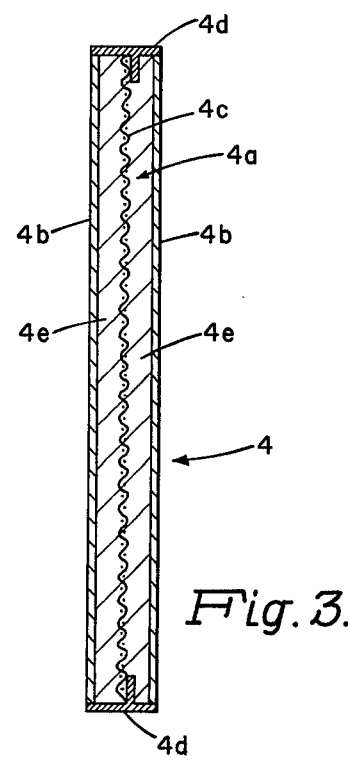
FIG. 3 is a side view in section of the electrode/separator structure in accordance with the invention.

Referring now to FIG. 1, there is shown in a detailed cross-sectional view an electrochemical cell 1 in accordance with the invention. The electrochemical cell 1 includes a metal (e.g., stainless steel) housing or casing 2 within which an electrochemical system is contained. This electrochemical system includes a plurality of anodes 3, a plurality of electrode/separator structures 4 arranged in alternation with the anodes 3, and a cathodelectrolyte solution 5 in contact with the anodes 3 and electrode/separator structures 4. Each of the electrode/separator structures 4 takes a form as shown in FIGS. 2 and 3 and, as will be described in greater detail hereinafter, generally includes a cathode electrode 4a and a pair of separators 4b formed integrally on opposite sides of the cathode electrode 4a. The plurality of electrode/separator structures 4 are connected electrically to a cell terminal or rod 6 by means of a plurality of conductive brackets 7 secured to the electrode/separator structures 4, a cross-bar 8 mechanically coupling the brackets 7 and secured to the lower end of the cell terminal 6, and a metallic barrel 9 insulated from the terminal 6 and welded to a casing cover 10 to hermetically seal the electrochemical system within the housing 2. Although not shown in the drawing, the anodes 3 are also connected electrically to a corresponding cell terminal.

The electrochemical system provided within the housing 2 as briefly described hereinabove may take a variety of different forms. However, in a preferred construction of the cell 1, the anodes 3 are formed of an oxidizable active alkaline metal such as lithium, and the aforementioned cathodelectrolyte solution 5 in contact with the anodes 3 and the electrode/separator structures 4 comprises a reducible soluble cathode, such as thionyl chloride, and an electrolyte solute, such as lithium tetrachloroaluminate, dissolved in the thionyl chloride. A preferred form of the electrode/separator structures 4 which is compatible with the above selection of materials will now be described in connection with FIGS. 2 and 3.

As generally shown in FIGS. 2 and 3 and as previously mentioned, each of the electrode/separator structures 4 includes a cathode electrode 4a and a pair of separators 4b formed integrally on opposite sides of the cathode electrode 4a. The cathode electrode 4a, when used with the aforementioned specific materials of the cell 1, acts as a cathode current collector and as a catalyst where the reduction of the solvent (thionyl chloride) in the cathodelectrolyte solution 5 takes place. In a preferred form of the cathode electrode 4a, the electrode includes a metallic substrate 4c (e.g., of nickel) supported on a frame 4d and having a plurality of interstice-defining members, as best shown in FIG. 2, and an aggregate 4e of discrete, semi-rigid, porous carbon conglomerates defining a network of electrolyte-conducting channels extending throughout the cathode electrode. The conglomerates are impressed on opposite sides of the interstice-defining substrate 4c for structural support thereby. The substrate members defined by the substrate 4c electrically contact the cathode electrode throughout its interior to function as a current collector for the cathode electrode. Owing to the electrolyte-conducting channels formed throughout the cathode electrode 4a, the cathodelectrolyte solution 5 can penetrate the electrode and contact interior cathodic particles, thereby providing substantial active surface areas for increasing the rate capability and cell discharge capacity of the cell. The conglomerates generally contain a combination of carbon black, graphite, and a binder such as tetrofluoroethylene fluorocarbon polymers and fluorinated ethylene-propylene resins. This latter binder is commercially available in the trade under the designation "Teflon". Suitable processing techniques for forming the cathode electrode 4a as described hereinabove are set forth in the aforementioned U.S. Pat. No. 4,161,063 to which reference may be made for specific details.

Each of the separators 4b used with the cathode electrode 4a as discussed hereinabove is selected of an electrically non-conductive (i.e., insulative) material which can be formed into a porous film or layer for allowing electrolytic solution to pass therethrough, and which is inert under normal operating conditions to any component of the cell. In addition, when such material is formed on the various cathode electrodes 4a, the ohmic resistivity between electrodes should be of a small value. For the aforementioned specific materials of the electrochemical cell 1, a particularly suitable material for the separator 4b is aluminum oxide ($Al_2O_3$), commonly known as alumina. This material, which is normally in a granular or powder form, is an electrically-non-conductive material and can be formed into a porous film or layer. The cathodelectrolyte solution 5 (including thionyl chloride and lithium tetrachloroaluminate) is able to pass through the layer and then through the cathode electrode 4a. In addition, this material is kinetically and chemically stable under normal operating conditions and will not react with such materials of the electrochemical cell 1 as lithium, thionyl chloride, lithium tetrachloroaluminate, nickel, carbon black, etc. Further, this material does not add to the impurities in the cell 1 as in the case of fiberglass separators using a polyvinyl alcohol binder.

The separators 4b of alumina can be bonded to a cathode electrode 4a as described hereinabove in several different ways. For example, alumina in granular or powder form, in the micron range (e.g., 0.1 to 100 microns), can be sprayed dry onto opposite surfaces of a cathode electrode 4a and physically pressed into the cathode electrode 4a. Alternatively, the alumina can be prepared in the form of a slurry with water or a combination of water and a binder such as "Teflon" and sprayed or brushed onto, and then physically pressed into, the cathode electrode 4a. The cathode electrode 4a may also be dipped into a slurry. A workable water slurry can range from 1% alumina and 99% water, by weight, to 99% alumina and 1% water, by weight. If a binder (e.g., "Teflon") is used, a suitable range is 0–50% by weight although a preferred value is about $3\frac{1}{2}$% by weight. When the alumina has been deposited onto the cathode electrode 4a by any of the above-mentioned techniques, the resulting structure is dried in an oven under vacuum, for example, one-half atmosphere or less absolute pressure, and at an elevated temperature, for example, approximately 100° C. The resulting structure may also be dried in air although this technique requires a longer drying period. A typical resulting thickness for each alumina separator 4b can be considerably less than a fiberglass separator, for example, from 0.001 inch to 0.005 inch, the particular thickness being dependent on the granularity of the alumina. The small thickness of the alumina separator 4b also results in a value of ohmic resistivity lower than that of fiberglass separators. In addition, the pore size of the alumina across the separator 4b is more uniform than with fiberglass separators, thereby allowing the electrolytic solution of the cell to diffuse through the separator 4b at a faster rate. A further desirable feature of the alumina separator 4b is that it is capable of reacting with the lithium anodes 3 at elevated temperatures. In the event of an undesirable condition causing overheating of the cell 1, an alloy of aluminum with lithium will form as the alumina is reduced by the lithium, resulting in passivation of the lithium anode. Since lithium alloys cannot operate as high rate anodes, cell activity ceases, thereby protecting the cell from physical damage.

Although a specific preferred combination of materials for the cell 1 has been presented hereinabove, it is to be appreciated that many variations are possible. For example, a separator can be formed of materials or a combination of materials other than alumina as long as they are electrical insulators. Examples are magnesium oxide, magnesium silicate, zirconium oxide, talc (a natural hydrous magnesium silicate), or a molecular seive (a crystalline aluminosilicate material). The particular material or combination of materials will generally be dictated by the size of the electrode and the particular intended application. It is also possible to form a separator as discussed hereinabove on a metal electrode.

While there has been described what are considered to be preferred embodiments of the invention, it will be obvious to those skilled in the art that various changes and modifications may be made therein without departing from the invention as called for in the appended claims.

What is claimed is:

1. An electrochemical cell comprising:
   an anode electrode;
   an electrode/separator structure adjacent to the anode electrode; and
   an electrolytic solution in contact with the anode electrode and the electrode/separator structure;
   said electrode/separator structure comprising a metallic substrate having a plurality of interstice-defining members, an aggregate of discrete, semi-rigid, porous carbon conglomerates physically pressed into and supported by the interstice-defining members of the metallic substrate and defining a network of channels through the resultant structure by which said structure may be permeated by the electrolytic solution, said carbon conglomerates including carbon black and a binder, and an adherent porous layer of an electrically non-conductive material deposited on and physically integrated with the aggregration of carbon conglomerates of the electrode/separator structure, the material of said layer being chemically stable with the anode electrode, the metallic substrate, the carbon conglomerates and the electrolytic solution and being permeable by the electrolytic solution, said adherent porous layer consisting essentially of a material selected from the group consisting of aluminum oxide, magnesium silicate, zirconium oxide, talc, a molecular seive, and combinations thereof.

2. An electrochemical cell in accordance with claim 1 wherein:
the anode electrode includes an oxidizable active alkaline metal; and
the electrolytic solution includes a reducible soluble cathode and an electrolyte solute dissolved therein.

3. An electrochemical cell in accordance with claim 2 wherein:
the oxidizable active alkaline metal of the anode electrode is lithium;
the reducible soluble cathode of the electrolytic solution is thionyl chloride;
the electrolyte solute is lithium tetrachloroaluminate; and
the material of the adherent porous layer consists essentially of alumium oxide.

4. An electrochemical cell in accordance with claim 3 wherein:
the aluminum oxide has a pore size in a range of 0.1 to 100 microns.

5. An electrochemical cell in accordance with claim 3 wherein:
the layer of aluminum oxide has a thickness of 0.001 inch to 0.005 inch.

* * * * *